United States Patent
Warren et al.

(10) Patent No.: US 10,163,319 B2
(45) Date of Patent: *Dec. 25, 2018

(54) SECURITY SYSTEM TRACKING OF REMOTE ITEMS USING REDUCED POWER

(71) Applicant: Vivint, Inc., Provo, UT (US)

(72) Inventors: Jeremy B. Warren, Draper, UT (US); James E. Nye, Alpine, UT (US)

(73) Assignee: Vivint, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/785,728

(22) Filed: Oct. 17, 2017

(65) Prior Publication Data

US 2018/0102037 A1 Apr. 12, 2018

Related U.S. Application Data

(63) Continuation of application No. 15/227,755, filed on Aug. 3, 2016, now Pat. No. 9,799,190, which is a (Continued)

(51) Int. Cl.
*G08B 1/00* (2006.01)
*G08B 21/02* (2006.01)
(Continued)

(52) U.S. Cl.
CPC ......... *G08B 21/0275* (2013.01); *G06Q 10/06* (2013.01); *G06Q 10/08* (2013.01); (Continued)

(58) Field of Classification Search
CPC ............ G08B 21/0275; G08B 21/0269; G08B 21/0272; G06Q 10/06; G06Q 10/08; G06Q 50/28; H04W 4/023
(Continued)

(56) References Cited

U.S. PATENT DOCUMENTS

| 5,400,246 A | 3/1995 | Wilson et al. |
| 5,491,486 A | 2/1996 | Welles, II et al. |
| (Continued) | | |

FOREIGN PATENT DOCUMENTS

JP 2010529520 A 8/2010

OTHER PUBLICATIONS

US 6,693,685, 02/2004, Macleod (withdrawn)
International Search Report for PCT/US2014/023495, dated Aug. 22, 2014.

*Primary Examiner* — Daryl Pope
(74) *Attorney, Agent, or Firm* — Holland & Hart, LLP

(57) ABSTRACT

A mobile tracking unit includes a controller having a processor, a memory in electronic communication with the processor, and instructions stored in the memory. The instructions are executable by the processor to communicate with a control unit of an automation and security system, determine a position of the mobile tracking unit relative to a base station using a low power location module, and communicate the position of the mobile tracking unit to at least one of the base station and a control unit of the automation and security system. When the mobile tracking unit is outside a specified range from the mobile tracking unit, the controller continues tracking the position of the mobile tracking unit with the low power location module. When the mobile tracking unit is inside the specified range, the controller determines the position of the mobile tracking unit using a high power location module.

20 Claims, 11 Drawing Sheets

Related U.S. Application Data continuation of application No. 14/202,789, filed on Mar. 10, 2014, now Pat. No. 9,424,729.

(60) Provisional application No. 61/794,298, filed on Mar. 15, 2013.

(51) Int. Cl.
| | |
|---|---|
| *G06Q 10/06* | (2012.01) |
| *G06Q 10/08* | (2012.01) |
| *G06Q 50/28* | (2012.01) |
| *H04W 4/02* | (2018.01) |
| *G08B 25/14* | (2006.01) |
| *H04W 84/04* | (2009.01) |
| *H04W 88/08* | (2009.01) |

(52) U.S. Cl.
CPC ......... *G06Q 50/28* (2013.01); *G08B 21/0269* (2013.01); *G08B 21/0272* (2013.01); *H04W 4/023* (2013.01); *G08B 25/14* (2013.01); *H04W 84/042* (2013.01); *H04W 88/08* (2013.01); *Y02B 70/30* (2013.01); *Y02D 70/00* (2018.01); *Y02D 70/1224* (2018.01); *Y02D 70/142* (2018.01); *Y02D 70/144* (2018.01); *Y02D 70/164* (2018.01); *Y02D 70/166* (2018.01)

(58) Field of Classification Search
USPC ............. 340/539.1, 539.11, 539.13, 506, 3.1
See application file for complete search history.

(56) References Cited

U.S. PATENT DOCUMENTS

| | | | |
|---|---|---|---|
| 5,959,529 | A | 9/1999 | Kail, IV |
| 7,437,167 | B2 | 10/2008 | Kartchner et al. |
| 7,760,137 | B2 | 7/2010 | Martucci et al. |
| 7,825,794 | B2 | 11/2010 | Janetis |
| 7,852,262 | B2 | 12/2010 | Namineni et al. |
| 8,081,072 | B2 | 12/2011 | Scalisi et al. |
| 8,321,124 | B2 | 11/2012 | Curatolo et al. |
| 9,424,729 | B2 * | 8/2016 | Warren .............. G08B 21/0272 |
| 2012/0235860 | A1 | 9/2012 | Ghazarian |
| 2013/0076523 | A1 | 3/2013 | Kwan et al. |

\* cited by examiner

SECURITY SYSTEM TRACKING OF REMOTE ITEMS USING REDUCED POWER

CROSS REFERENCE

This application is a continuation of U.S. patent application Ser. No. 15/227,755, filed Aug. 3, 2016, and entitled SECURITY SYSTEM TRACKING OF REMOTE ITEMS USING REDUCED POWER, which is a continuation of U.S. patent application Ser. No. 14/202,789, filed Mar. 10, 2014, and entitled SECURITY SYSTEM TRACKING OF REMOTE ITEMS USING REDUCED POWER, which claims the benefit of the filing date of U.S. Provisional Application No. 61/794,298, filed Mar. 15, 2013, and entitled SECURITY SYSTEM TRACKING OF REMOTE ITEMS USING REDUCED POWER, which has been assigned to the assignee hereof. The disclosures of each of which are incorporated by reference herein in their entireties.

TECHNICAL FIELD

This disclosure relates generally to security systems and/or automation systems and, more specifically, to tracking remote items from a base station, such as a control unit of a security system or automation system. In some embodiments, approaches that preserve battery life of the mobile tracking unit may be used to track a remote item.

BACKGROUND

Security systems are widely used to protect property and provide personal safety. Security systems generally include a control unit, which controls the overall operation of the system, one or more keypads for user access to the system, and various detectors and sensors.

Security systems may generate an alarm in response to any number of events, such as unauthorized entry, fire, medical emergency or manual alarm activation. Further, a security system may be associated with a service that remotely monitors the status of the security system. Thus, if the security system generates an alarm, a notification signal may be transmitted via a wired and/or wireless communications link to a central station. Upon receiving the notification signal, security service personnel at the central station may attempt to contact the property owner or other party at the secured location to verify the alarm. If it is appropriate to do so, the security service personnel may, upon confirmation of the alarm, contact an emergency response agency (e.g., the police department, the fire department or an emergency medical team, etc.).

Security systems have therefore enhanced the ability of homeowners and businesses to monitor their premises and to protect against break-ins and the crimes that may accompany them (e.g., theft, damage to property, assault and battery, stalking, intrusion into privacy, etc.).

Automation systems for buildings (e.g., homes, etc.) and space in buildings (e.g., apartments, condominiums, retail space, office space, etc.) are installed for convenience, efficiency and to enable the occupants of a building or space within a building to remotely control devices within that space.

The roles of security systems and automations systems continue to expand. Many homes and businesses contain valuable property that may be removed from the premises. For example, a homeowner may have a laptop computer, an automobile, or other valuables that may be removed from the premises. A home owner may want to know the whereabouts of the children. Some items, such as a purse or car keys, may be easily misplaced.

Mobile tracking units may be attached to such items to help monitor their locations. However, power management of the mobile tracking units may be a significant problem; it is inconvenient to constantly recharge mobile tracking units. Furthermore, if the mobile tracking unit drains the battery before it may be found, the mobile tracking unit becomes essentially useless.

SUMMARY

Disclosed herein are devices and approaches to locating a mobile tracking unit in an efficient manner. In one specific embodiment, a mobile tracking unit comprising includes a controller for an automation and security system. The controller includes a processor, a memory in electronic communication with the processor, and instructions stored in the memory, the instructions being executable by the processor to communicate with a control unit of the automation and security system, determine a position of the mobile tracking unit relative to a base station using a low power location module, and communicate the position of the mobile tracking unit to at least one of the base station and a control unit of the automation and security system. When the mobile tracking unit is outside a specified range from the mobile tracking unit, the instructions are executable by the processor to continue tracking the position of the mobile tracking unit with the low power location module. When the mobile tracking unit is inside the specified range from the mobile tracking unit, the instructions are executable by the processor to determine the position of the mobile tracking unit using a high power location module.

In one example, the controller may receive a message indicating whether the base station is outside the specified range. The controller may communicate the position of the mobile tracking unit over a cellular network. The controller may communicate the position of the mobile tracking unit using the high power location module. The low power location module may be one of a wireless Internet module and a cellular network module. The high power location module may include a global positioning system (GPS) module. The controller may be configured to enter a low power mode for a sleep interval after communicating the position of the mobile tracking unit. The controller may dynamically adjusts a length of the sleep interval based on change in position of the mobile tracking unit. The controller may dynamically adjusts a length of the sleep interval based on proximity of the mobile tracking unit to the base station. The controller may be configured to maintain an active power mode after communicating the position of the mobile tracking unit. The controller may be configured to determine whether the position of the mobile tracking unit is substantially different from a most recently communicated position of the mobile tracking unit, and communicate the position of the mobile tracking unit to the base station in response to the position of the mobile tracking unit being substantially different from the most recently communicated position.

Another embodiment is directed to a system that includes a control unit for one of a security system and an automation system communicatively coupled with a mobile tracking unit, and a base station configured to locate the mobile tracking unit. The mobile tracking unit is configured to provide a current location of the mobile tracking unit to the base station and includes a cellular module configured to communicate over a cellular network, a global positioning system (GPS) module configured to obtain location information for the mobile tracking unit using a GPS network, and a controller configured to determine the current location of the mobile tracking unit using the cellular module if a distance separating the base station and the mobile tracking unit is greater than a first value, and determine the current location of the mobile tracking unit using the GPS module if the distance separating the base station and the mobile tracking unit is less than the first value.

In one example, the mobile tracking unit may provide the current location to the base station by communicating the current location to the control unit. The mobile tracking unit may provide the current location to the base station by communicating the current location directly to the base station. The control unit may be configured to receive an active tracking event from a user, store the active tracking event, and communicate the active tracking event to the mobile tracking unit.

A further embodiment relates to a computer-implemented method operable using an automation and security system. The method includes determining a current position of a mobile tracking unit, determining a current position of a base station, determining a next position of the mobile tracking unit using a low power location module in response to a difference between the current position of the mobile tracking unit and the current position of the base station being greater than a predefined value, and determining a next position of the mobile tracking unit using a high power location module in response to a difference between the current position of the mobile tracking unit and the current position of the base station being greater than a predefined value.

The method may also include communicating the current position of the mobile tracking unit to the base station. The method may further include putting a controller of the mobile tracking unit in a low power mode for a sleep interval following each communication of the current position of the mobile tracking unit using the low power location module. The method may include determining a current position of the mobile tracking unit using the low power location module while there is no active tracking event that is open. The method may include determining a current position of the mobile tracking unit using the high power location module while there is an active tracking event that is open.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
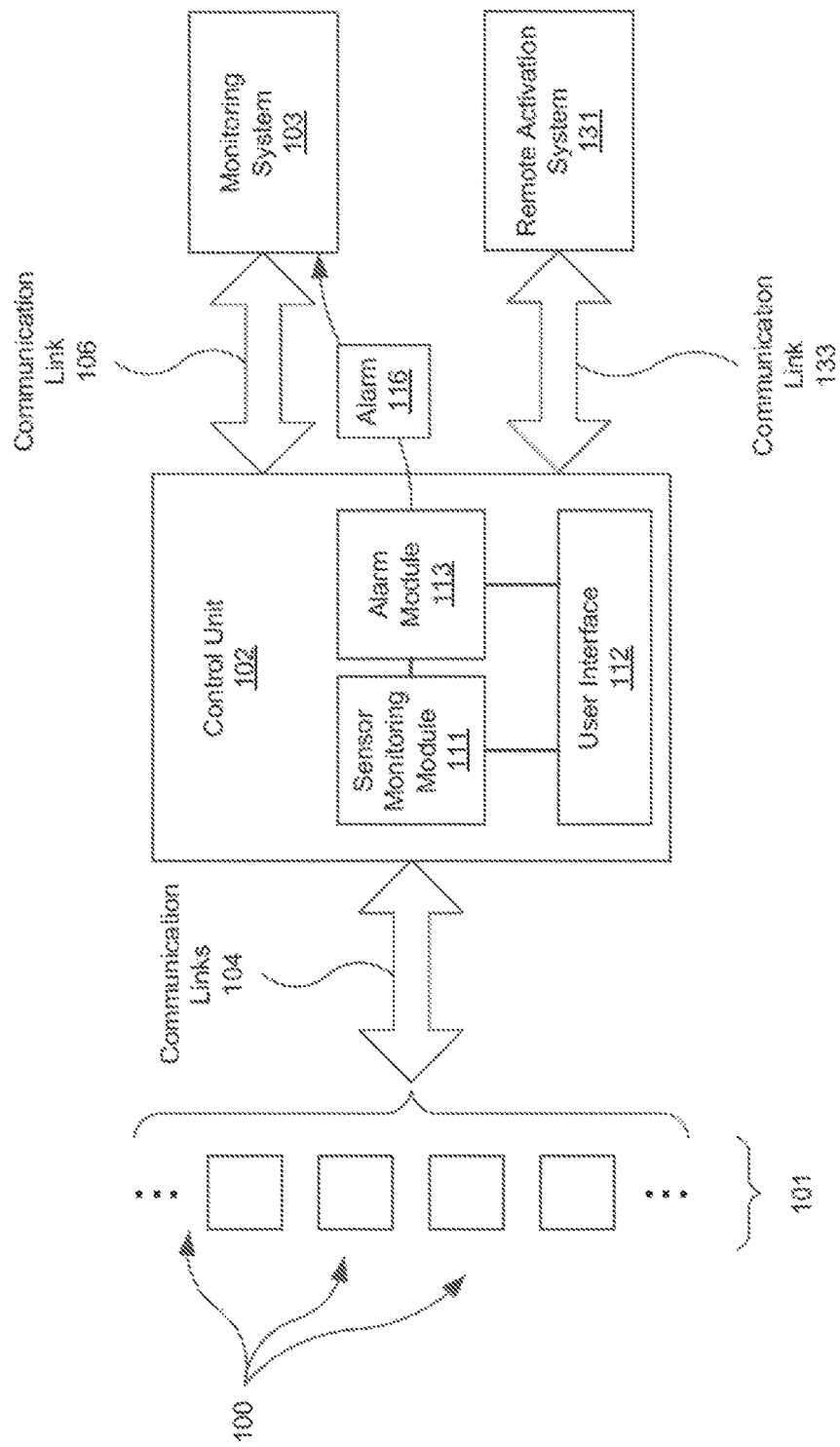
FIG. 1 illustrates an embodiment of a security or automation system.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Referring in general to the accompanying drawings, various embodiments of the present disclosure are illustrated to show the structure and methods for installing a component within a system, such as a security system or an automation system. Security and automation systems may generally be referred to herein as an automation and security system or an automation system (e.g., having security features). Common elements of the illustrated embodiments are designated with like numerals. It should be understood that the figures presented are not meant to be illustrative of actual views of any particular portion of the actual device structure, but are merely schematic representations which are employed to more clearly and fully depict embodiments of the disclosure.

The following provides a more detailed description of the present disclosure and various representative embodiments thereof. In this description, functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present invention and are within the abilities of persons of ordinary skill in the relevant art.

In this description, some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

FIG. 1 illustrates an embodiment of an automation and security system 100, which may also be referred to as an "alarm system" or a "security system." Security system 100 includes sensors 101, a control unit 102 (also referred to as a control panel), monitoring system 103, and remote activation system 131. Communication links 104 (which may be a combination of wired and wireless communication links) couple sensors 101 to control unit 102. Wired communication links may include circuit loops that are either detected as closed or open. In some embodiments, sensors 101 and control unit 102 are located in the same facility, such as in the same residence or in the same building. Communication link 106 (which may be a wired telephone connection, wired or wireless network connection, cellular connection, etc., or combination thereof) may couple the control unit 102 to monitoring system 103. In other embodiments, the system shown in FIG. 1 may be implemented without a monitoring system 103.

Sensors 101 monitor for certain events and report relevant events to the control unit 102. Sensors 101 may include any of a variety of different types of sensors, such as door and window sensors, motion sensors, glass break sensors (e.g., sensors that detect a physical break or detecting the sound of a glass break), etc. The control unit 102 may be configured to monitor sensors 101 for alarm conditions via communication links 104 and relay alarms to monitoring system 103 via communication link 106.

Control unit 102 may include sensor monitoring module 111, user interface 112, and alarm module 113. Sensor monitoring module 111 is configured to monitor sensors 101. Sensors 101 may sense and/or indicate a change in their physical surroundings (e.g., a normally closed connection becomes open, a signal indicating that the sound of breaking glass was detected, etc.) which may be indicative of an unauthorized access. The sensors 101 may communicate the event on communication links 104. For example, a circuit connected to a door sensor may transition from closed to open (or to a resistance exceeding a pre-determined resistance threshold) indicating that a door has been opened. A motion sensor may send an electrical signal indicative of detected motion. Sensor monitoring module 111 may monitor communication links 104 for indications and signals sent from sensors 101. Upon sensor monitoring module 111 receiving an indication or signal of a change in physical surroundings, sensor monitoring module 111 may send the indication or signal to alarm module 113. When appropriate, alarm module 113 may treat a monitored indication or signal from a sensor as an alarm condition.

User interface 112 may include an input interface and an output interface. The input interface may comprise a physical input interface or virtual input interface that includes one or more a numeric key pad (e.g., for entering a disarm code, etc.), sensor activation buttons, physical duress buttons, etc. The input interface may also include a condenser for receiving audio input and/or communicating with monitoring system 103. The output interface may include an output display device that displays system status, such as armed and disarmed, sensors/zones that have detected change in physical surroundings, etc. The output interface may also include a speaker that audibly outputs information similar to that displayed on the output display device. The speaker may also be used by monitoring system 103 to communicate with a user of control unit 102.

Figure 2:
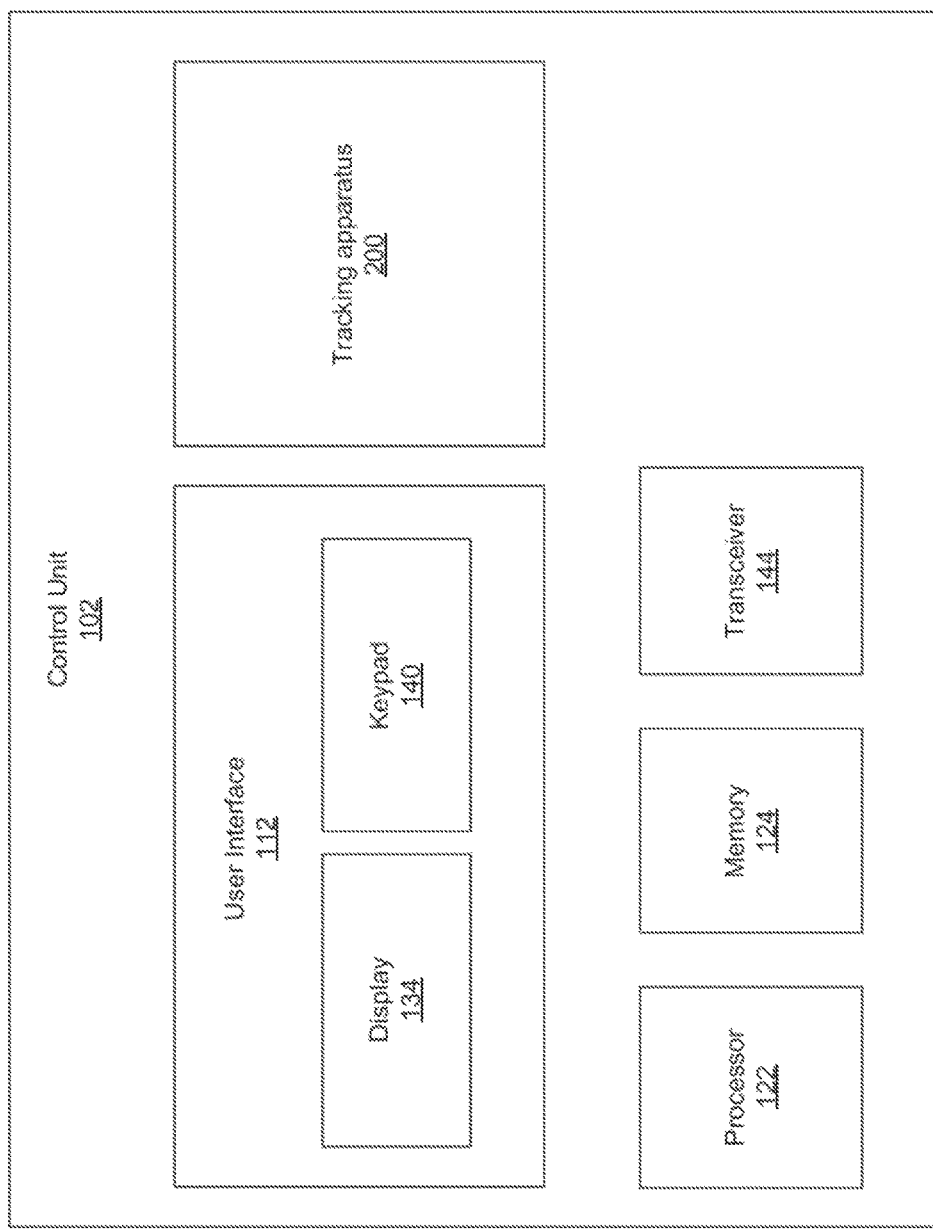
FIG. 2 is a block diagram of an embodiment of a control unit of a security system or an automation system.

FIG. 2 is a block diagram of one embodiment of a control unit 102. Control unit 102 may include a processor 122, memory 124, transducer 136, transceiver 144, and user interface 112. User interface 112 may include various input/output (I/O) devices, such as a display 134, which may comprise a touch screen, and keypad 140. Control unit 102 may further include a transceiver 144 for receiving and transmitting data over a network. It is noted that a "communication interface" as referred to herein may comprise transceiver 144 and user interface 112. The control unit 102 may be capable of communicating over more than one network; for example, the control unit 102 may be capable of communicating with a radio frequency identification (RFID) tag, a wireless Internet network, a cellular network, and others.

Generally, control unit 102 may operate under control of an operating system stored in memory 124, and interface with a user to accept inputs and commands and to present outputs through user interface 112. Control unit 102 may also implement a compiler (not shown) which allows one or more application programs (not shown) written in a programming language to be translated into processor 122 readable code. In one embodiment, instructions implementing an application program may be tangibly embodied in a computer-readable medium. Further, an application program may include instructions which, when read and executed by processor 122, may cause processor 122 to perform the steps necessary to implement and/or use embodiments of the present disclosure. It is noted that an application program and/or operating instructions may also be tangibly embodied in memory 124 and/or data communications devices, thereby making a computer program product or article of manufacture according to an embodiment of the present disclosure. As such, the term "application program" as used herein is intended to encompass a computer program accessible from any computer readable device or media. Furthermore, portions of the application program may be distributed such that some aspects of the application program may be included on a computer readable media within control unit 102, and some aspects of the application program may be included in a remote device, such as a remote computer.

The control unit 102 may further include a tracking apparatus 200. The tracking apparatus 200 may be realized as hardware, firmware, software, or some combination thereof. The tracking apparatus 200 may include computer executable instructions stored in memory 124 for execution by the processor 122 of the control unit 102. The tracking apparatus 200 may monitor the location of one or more mobile tracking units and provide information concerning the location of the one or more mobile tracking units through the user interface 112. For example, the tracking apparatus 200 may cause the user interface 112 to display a map and the locations of the one or more mobile tracking units on the map. The tracking apparatus 200 may be further configured to transmit information to and from the mobile tracking units.

In certain embodiments, the tracking apparatus 200 may log the information representing the positions of the mobile tracking unit that are reported to the control unit 102. The tracking apparatus 200 may log the positional information in a database. The tracking apparatus 200 may further associate the positional information with a time the positional information was received. This may allow the tracking apparatus 200 to provide accurate information about the movement and location of the mobile tracking unit that generated the positional information over a period of time.

Figure 3:
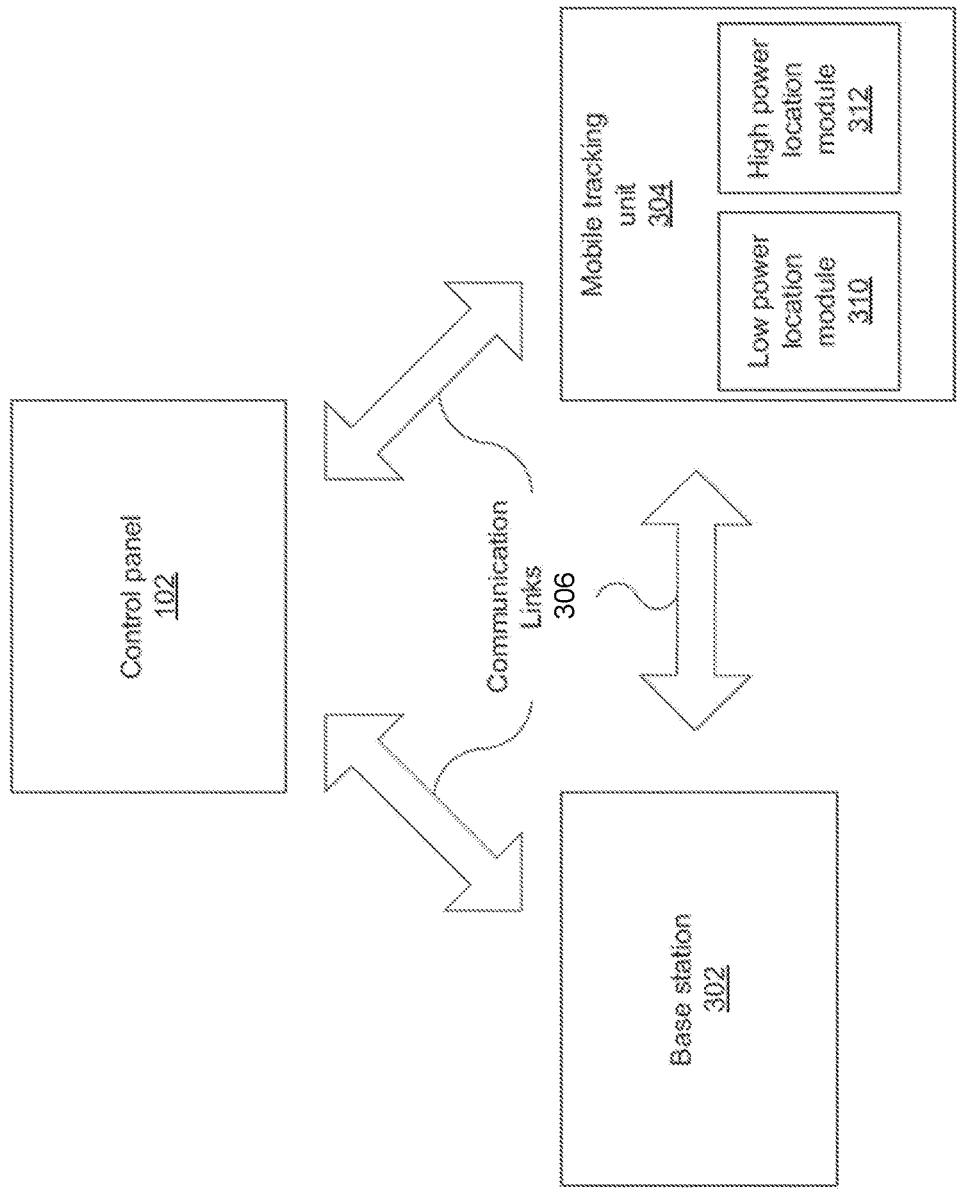
FIG. 3 illustrates a control unit of a security system or automation system communicatively coupled to a base station and a mobile tracking unit via a network.

FIG. 3 is a block diagram illustrating one embodiment of a system comprising the control unit 102, a base station 302, and a mobile tracking unit 304. The control unit 102, the base station 302, and the mobile tracking unit 304 may be communicatively coupled by communications links 306. The communications links 306 may include a cellular link, a wireless Internet link, or other of a variety of communications links 306.

The base station 302 is a portable electronic device capable of communicating information over a communications link 306. The base station 302 may be a cellular phone, a tablet computer, a laptop computer, the control unit 102, or other variety of portable electronic device. The base station 302, in a preferred embodiment, has access to a communications network that is available over a large geographic region such as a cellular network. The base station 302 may have software implemented thereon enabling the base station 302 to perform the functions described below. For example, the base station 302 may be a cellular phone with an application enabling the cellular phone to perform the functions of the base station 302 described herein.

The mobile tracking unit 304 is a portable electronic device capable of communication information over a communications link 306. Like the base station 302, the mobile tracking unit 304 preferably has access to a communications network that is available over a large geographic region. The mobile tracking unit 304 may be a small, physical tag that may be attached to keys, a purse, a child, a pet, or other object, person, or thing that a user may want to locate. In other embodiments, the mobile tracking unit 304 is a portable electronic device such as a cellular phone, a laptop, or other device that may be equipped with software to provide the functionality described below.

As noted above, a device implementing a mobile tracking unit 304 (e.g., a cellular phone) or attached to a mobile tracking unit 304 (e.g., a set of keys) may be easily misplaced. The mobile tracking unit 304 provides its current location such that a user may locate the mobile tracking unit 304. The mobile tracking unit 304 may provide its current location to the base station 302, the control unit 102, or both. The mobile tracking unit 304 may provide its current location to the base station 302 directly by, for example, sending a message that includes the current location to an address of the base station 302. The mobile tracking unit 304 may provide its current location to the base station 302 indirectly by, for example, sending a message that includes the current location to an address of the control unit 102, where the base station 302 may then retrieve the message. In other embodiments, the mobile tracking unit 304 may send its current location directly to the base station 302 and the control unit 102.

In one embodiment, the control unit 102 is provided with a feature (e.g., a soft button or hard button) allowing a user to determine the location of the mobile tracking unit 304. In response to the user requesting location information, the mobile tracking unit 304 may report its location. In certain embodiments, each mobile tracking unit 304 associated with the control unit 102 provides its location to the control unit 102 at regular intervals. In other embodiments, the user may select a particular mobile tracking unit 304 and request its position from the control unit 102.

In one embodiment, the control unit 102 is configured to monitor whether or not a mobile tracking unit 304 is within a predetermined range of the control unit 102. The range may be defined as a certain distance from the control unit 102. In another embodiment, the range is specified as certain geographic areas, such as an area defined by a set of streets on a map. The user may define the range using the control unit 102. The control unit 102 may be configured to alert a user if a mobile tracking unit 304 is outside of the range. For example, a user may define a range that corresponds to the house and yard where the control unit 102 is installed. If a toddler with the mobile tracking unit 304 attached to him leaves the range, the control unit 102 may sound to notify the user.

The mobile tracking unit 304 may, in certain embodiments, send information directly to the base station 302. In other embodiments, the mobile tracking unit 304 sends information to the base station 302 through one or more intermediate devices; for example, the mobile tracking unit 304 may send data to the cloud, and the base station may retrieve that information from the cloud, and vice versa. Certain communication modules may use different approaches for communication; for example, an RFID module of the mobile tracking unit 304 may communicate directly with the base station 302 while a GSM module communicates with the cloud.

The mobile tracking unit 304 may include a low power location module 310 and a high power location module 312 that may determine the current location of the mobile tracking unit 304. The low power location module 310 may be able to determine the current location of the mobile tracking unit 304 with relatively low power expenditure, but it may have relatively low precision. For example, the low power location module 310 may be a wireless Internet module as described in greater detail below. A wireless Internet module may connect to a wireless Internet connection, allowing an approximate location of the mobile tracking unit 304 to be determined. The mobile tracking unit 304 may report that its location is within a certain distance of the device generating the wireless Internet signal to which mobile tracking unit 304 has connected. This may provide a reasonable estimate of the location of the mobile tracking unit 304 at a relatively low cost in terms of power consumption. Providing the current location of the mobile tracking unit 304 using the low power location module 310 may thus help preserve battery life for the mobile tracking unit 304. The low power location module 310 may be an RFID module, a cellular module, a BlueTooth module, or other.

The mobile tracking unit 304 may include a high power location module 312. The high power location module 312 generally determines the position of the mobile tracking unit 304 with higher precision than the low power location module 310. For example, the high power location module 312 may be a global positioning system (GPS) module. The GPS module may determine with considerable accuracy the location of the mobile tracking unit 304; however, GPS modules tend to require significant amounts of power that may quickly run the battery of the mobile tracking unit 304 empty. When the battery of the mobile tracking unit 304 is empty, its usefulness is severely diminished.

The mobile tracking unit 304 may be configured to provide a position of the mobile tracking unit 304 using the low power location module 310 if the position of the base station 302 is outside a specified range from the mobile tracking unit 304. For example, the mobile tracking unit 304 may use the low power location module 310 while the base station 302 is more than one mile from the mobile tracking unit 304. At such a distance, the lower precision of the mobile tracking unit 304 is less likely to affect the ability of the person using the base station 302 to find the mobile tracking unit 304.

The mobile tracking unit 304 may determine the position of the mobile tracking unit 304 using the high power location module 312 if the position of the base station 302 is inside a specified range from the mobile tracking unit 304. For example, as the user and the base station 302 get closer to the mobile tracking unit 304, the mobile tracking unit 304 may switch to a GPS system to obtain and provide more accurate information about the location of the mobile tracking unit 304. The mobile tracking unit 304 may then send that position to the base station 302. The increased accuracy is thus provided when it is most likely to be useful to the person seeking the mobile tracking unit 304, and may prevent unnecessary battery usage.

The mobile tracking unit 304 may be further configured to use the high power location module 312 only when the base station 302 is within a specified range from the mobile tracking unit 304 and when an active tracking event for the mobile tracking unit 304 is open. For example, it may be desirable to prevent the mobile tracking unit 304 from using the high power location module 312 when the location of the mobile tracking unit 304 is already known, or if the user is not looking for the mobile tracking unit 304. For example, the base station 302 and the mobile tracking unit 304 may be in close proximity when both are within the user's house; however, the user may be aware of the location of the mobile tracking unit 304. Using the high power location module 312 in such a situation would unnecessarily use power. The user may create an active tracking event to communicate to the mobile tracking unit 304 that it is being sought, and to use the high power location module 312 to aid in recovery of the mobile tracking unit 304.

The user may create an active tracking event using the control unit 102 and/or the base station 302. In one embodiment, the active tracking event is a true or false value that is stored in a database and that is retrieved by the mobile tracking unit 304 at intervals. In certain embodiments, the control unit 102 and/or the base station 302 notifies the user once the mobile tracking unit 304 receives the active tracking event. In certain embodiments, described in greater detail below, it may be desirable to initiate an active tracking event from the mobile tracking unit 304 as well.

In another embodiment, the user may use the base station to activate the high power location module 312 of the mobile tracking unit 304 regardless of the position of the mobile tracking unit 304. For example, the user may know the general area of an object that is connected to the mobile tracking unit 304, but may desire to get the exact location of that mobile tracking unit 304. In such a scenario, the user may instruct the mobile tracking unit 304 to use the high power location module 312 to obtain a more precise location, regardless of the distance between the base station 302 and the mobile tracking unit 304.

Figure 4:
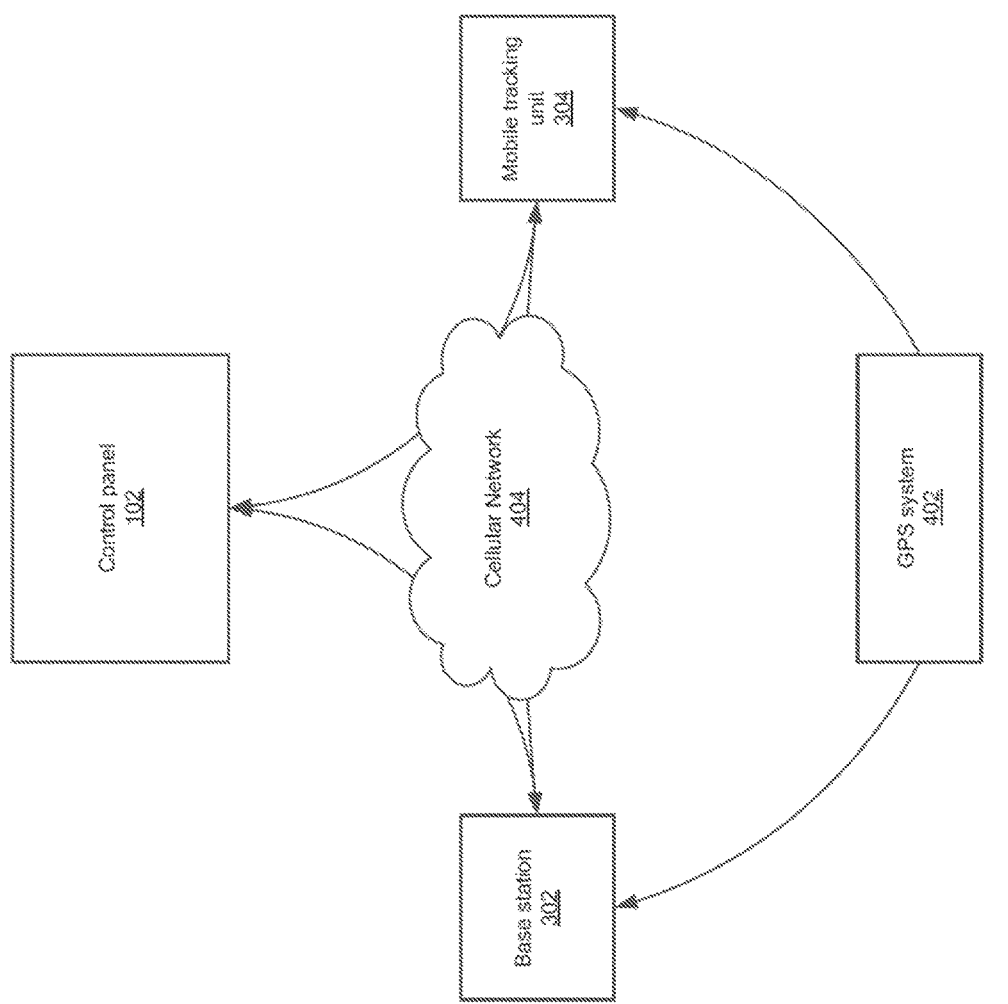
FIG. 4 depicts the control unit, the base station, the mobile tracking unit, and a GPS system that are communicatively coupled.

FIG. 4 is an illustration of one embodiment of a system having a control unit 102, a mobile tracking unit 304, and a base station 302. In the embodiment shown in FIG. 4, the mobile tracking unit 304 and the base station 302 have access to a GPS system 402 and a cellular network 404. The low power location module 310 may include a cellular module, and the high power location module 312 may include a GPS module.

The mobile tracking unit 304 and the base station 302 may be configured to send messages over the cellular network 404. The mobile tracking unit 304 may be in communication with the base station 302, the control unit 102, or both through the cellular network 404. As part of a setup process, the mobile tracking unit 304 may be associated with the control unit 102 and/or the base station 302 such that they may exchange information over the cellular network 404.

The mobile tracking unit 304 may use the cellular module and the cellular network 404 to provide the current position of the mobile tracking unit 304. The mobile tracking unit 304 may provide this information using a variety of approaches currently in use for locating devices, such as cellular phones, operating on a cellular network 404. For example, the position of the mobile tracking unit 304 may be determined using multilateration of radio signals between cellular towers of the cellular network 404 and the mobile tracking unit 304.

The position of the mobile tracking unit 304 may be determined using the cellular network 404 by considering various types of position information, including, but not limited to: the location of the cellular towers in communication with the mobile tracking unit 304; the power levels of the signals between the cellular tower and the mobile tracking unit 304; and the antenna patterns associated with communication between the cellular tower and the mobile tracking unit 304.

The mobile tracking unit 304 may provide the position of the mobile tracking unit 304 based on the cellular network 404 using an application installed on the mobile tracking unit 304. For example, the mobile tracking unit 304 may have software capable of identifying cellular towers communicating with the mobile tracking unit 304 and other position information. The mobile tracking unit 304 may have a subscriber identity module (SIM) card installed in connection with communication over the cellular network 404. The mobile tracking unit 304 may use information from the SIM card and information about the cellular network received by the mobile tracking unit 304 to determine the location of the mobile tracking unit 304.

In other embodiments, the cellular network 404 may be configured to determine the location of the mobile tracking unit 304 without participation of the mobile tracking unit 304. The mobile tracking unit 304 may send a message over the cellular network 404, which message allows the cellular network 404 to determine the location of the mobile tracking unit 304 and to provide that location to the control unit 102 and the base station 302. For example, the mobile tracking unit 304 may be configured to send a roaming signal. The cellular network 404 may use cell identification and/or triangulation techniques to determine the location of the mobile tracking unit 304. By sending a communication to or over the cellular network 404 in order to cause the cellular network 404 to determine the location of the mobile tracking unit 304, the mobile tracking unit 304 may provide its position to the control unit 102 and/or the base station 302.

In certain embodiments, the mobile tracking unit 304 is configured to use the cellular network 404 only if the mobile tracking unit 304 is unable to use another form of communication. In some situations, use of a cellular network 404 may incur expense to the user. The mobile tracking unit 304 may be configured to use the cellular network 404 as a last resort in order to avoid unnecessary costs.

The mobile tracking unit 304 may be configured to enter a low power mode (such as a sleep mode) between communications of its current position. The mobile tracking unit 304 may awaken at the end of an interval, provide its current position, and determine whether there is an active tracking event for the mobile tracking unit 304. The mobile tracking unit 304 may then determine whether to enter the low power mode for an additional sleep interval, the length of the sleep interval, and which method of location to use to determines its next location.

In one embodiment, the mobile tracking unit 304 awakens from the low power mode and determines the current position (i.e., the position at time t) of the mobile tracking unit 304 using the low power location module 310. The mobile tracking unit 304 may also receive the current position of the base station 302 over the cellular network 404. The mobile tracking unit 304 may then compare the difference between the current position of the mobile tracking unit 304 and the current position of the base station 302. The mobile tracking unit 304 may store a value in a memory location to be checked by the mobile tracking unit 304 at the end of the next sleep interval. If the difference is greater than a predefined value, the mobile tracking unit 304 may store a value causing the mobile tracking unit 304 to use the low power location module 310 to determine the next position of the mobile tracking unit 304. If the difference is smaller than the predefined value, the mobile tracking unit 304 may store a value causing the mobile tracking unit 304 to use the high power location module 312 to determine the next position of the mobile tracking unit 304. The mobile tracking unit 304 may then enter low power mode.

At the end of the next sleep interval (i.e., at the time t+1), the mobile tracking unit 304 awakens and checks the value written to the memory location. The value '0' may be associated with the low power location module 310 and the value '1' associated with the high power location module 312. If the value '1' is stored in the memory location, the mobile tracking unit 304 may determine its next position (i.e., the current position at time t+1) using the high power location module 312, such as a GPS module that may use the GPS system 402.

The mobile tracking unit 304 may communicate the current position and/or the next position using the cellular network 404. Where the mobile tracking unit 304 is using the GPS system 402 to determine its position, the mobile tracking unit 304 may receive GPS data from the GPS system 402 and send that GPS data in a message to the base station 302, the control unit 102, or both. The mobile tracking unit 304, when the GPS module is active, may use a combination of the GPS system 402 and the cellular network 404 to determine its position. For example, the mobile tracking unit 304 may use assisted GPS (often referred to as A-GPS or aGPS) to improve the speed and accuracy with which the mobile tracking unit 304 may determine its position using the GPS system 402.

Figure 5:
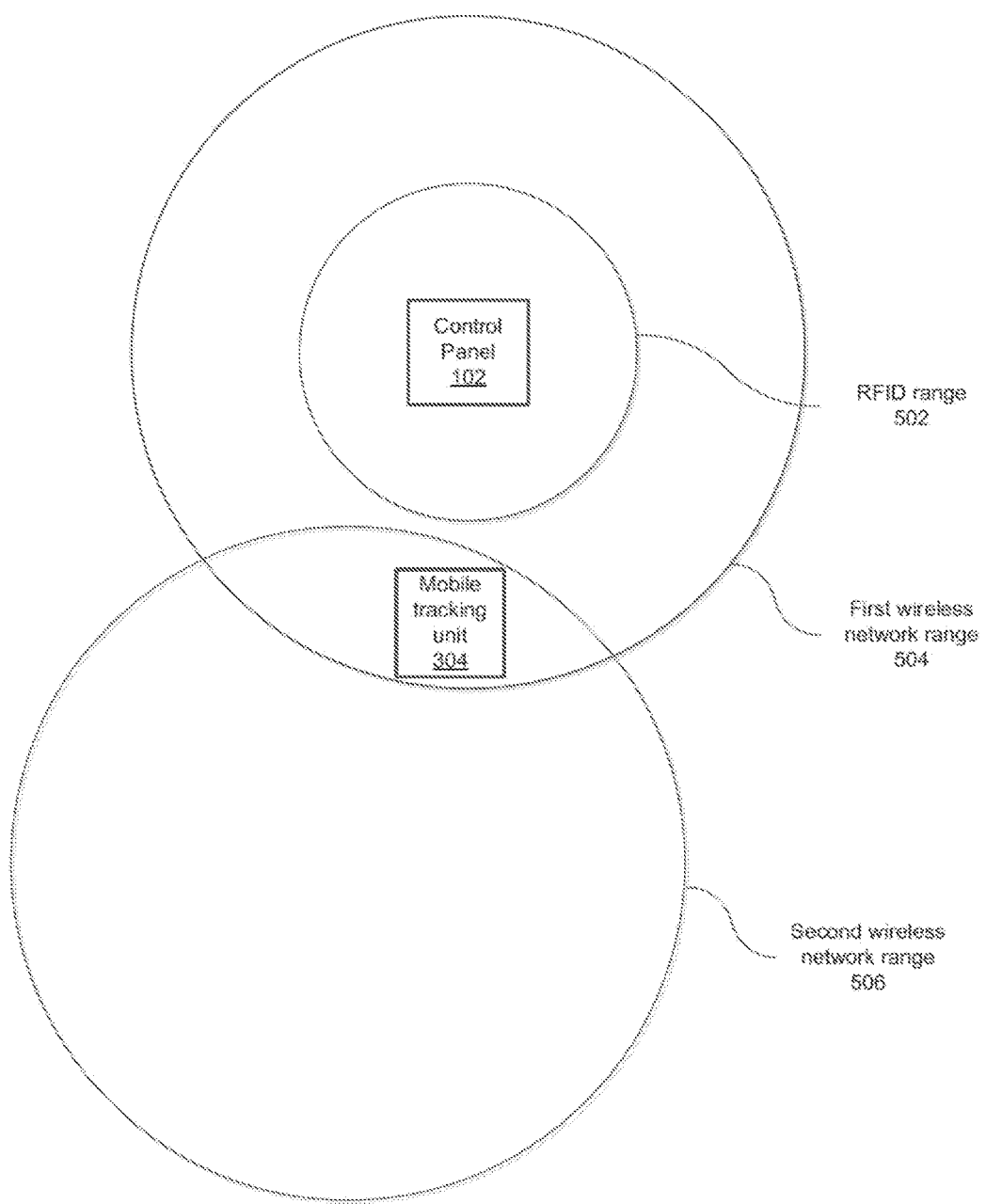
FIG. 5 is an illustrative block diagram depicting a diagram showing overlapping ranges which may be used to locate a mobile tracking unit.

FIG. 5 illustrates one possible implementation through which a mobile tracking unit 304 may determine its position. In the embodiment shown in FIG. 5, the control unit 102 is associated with an RFID range 502, a first wireless network range 504, and a second wireless network range 506. In such an embodiment, the mobile tracking unit 304 may include an RFID tag, a wireless Internet module, a cellular module, and a GPS module.

The control unit 102 may include an RFID reader capable of receiving an RFID signal from the mobile tracking unit 304. The mobile tracking unit 304 may include a passive RFID tag that the control unit 102 may read regardless of whether the controller of the mobile tracking unit 304 is in a sleep mode or an active mode. In other embodiments, the mobile tracking unit 304 includes an active RFID tag that provides a larger RFID range 502. The control unit 102 may be in communication with additional RFID readers throughout a facility such as a house. These RFID readers may be configured to communicate with the mobile tracking unit 304 and to provide information about the location of the mobile tracking unit 304 to the control unit 102.

The mobile tracking unit 304, upon awaking from a sleep interval, may first attempt to communicate with the control unit 102 using the lowest power option; for example, through RFID. If the mobile tracking unit 304 is outside the RFID range 502, the mobile tracking unit 304 will not be able to communicate using RFID. The mobile tracking unit 304 may power off an RFID module and power on a next-lowest power option, such as a wireless Internet module, and attempt to communicate with the control unit 102 using the next-lowest power option.

The mobile tracking unit 304 may be associated with a first wireless network range 504 and a second wireless network range 506. The mobile tracking unit 304 may search for one or more wireless Internet networks through which the mobile tracking unit 304 may communicate information and provide position information relating to the position of the mobile tracking unit 304. For example, the mobile tracking unit 304 may provide a message to the control unit 102 indicating that it is communicating over the wireless network associated with the first wireless network range 504. The control unit 102 may determine that the mobile tracking unit 304 is on the premises associated with the first wireless network range 504. If the mobile tracking unit 304 also reports that it is in communication with the second wireless network, the control unit 102 may further determine that the mobile tracking unit 304 is located in an area where the first wireless network range 504 and the second wireless network range 506 overlap. In other embodiments, the determination of the location of the mobile tracking unit 304 is made by the mobile tracking unit 304.

After communicating with the control unit 102, the mobile tracking unit 304 may store a value in memory causing the mobile tracking unit 304, upon awaking from the next sleep interval, to make its first communication attempt using the wireless Internet module. This may prevent the mobile tracking unit 304 from unnecessarily attempting to use the RFID module to communicate with the control unit 102 when it is reasonable to assume that the mobile tracking unit 304 is out of the RFID range 502. If, after a later communication, the mobile tracking unit 304 position is again in the RFID range 502, as determined using the wireless Internet module, the mobile tracking unit 304 may store a value in memory causing the mobile tracking unit 304, upon awaking from the next sleep interval, to attempt to communicate using the RFID module.

Similarly, if the mobile tracking unit 304 is out of the first wireless network range 504 and the second wireless network range 506, the mobile tracking unit 304 may power off the wireless Internet module and power on a cellular module for communicating over a cellular network 404. The mobile tracking unit 304 may, on subsequent awakenings, attempt to use the cellular network 404. If a subsequent position of the mobile tracking unit 304, as determined using the cellular network 404, is in the first wireless network range 504, the mobile tracking unit 304 may, on a subsequent awakening, first attempt to use the first wireless network range 504. Such an approach may help prevent the mobile tracking unit 304 from wasting power attempting to communicate over out-of-range networks, while still ensuring that the mobile tracking unit 304 attempts to use the lowest-power communications method.

Figure 6:
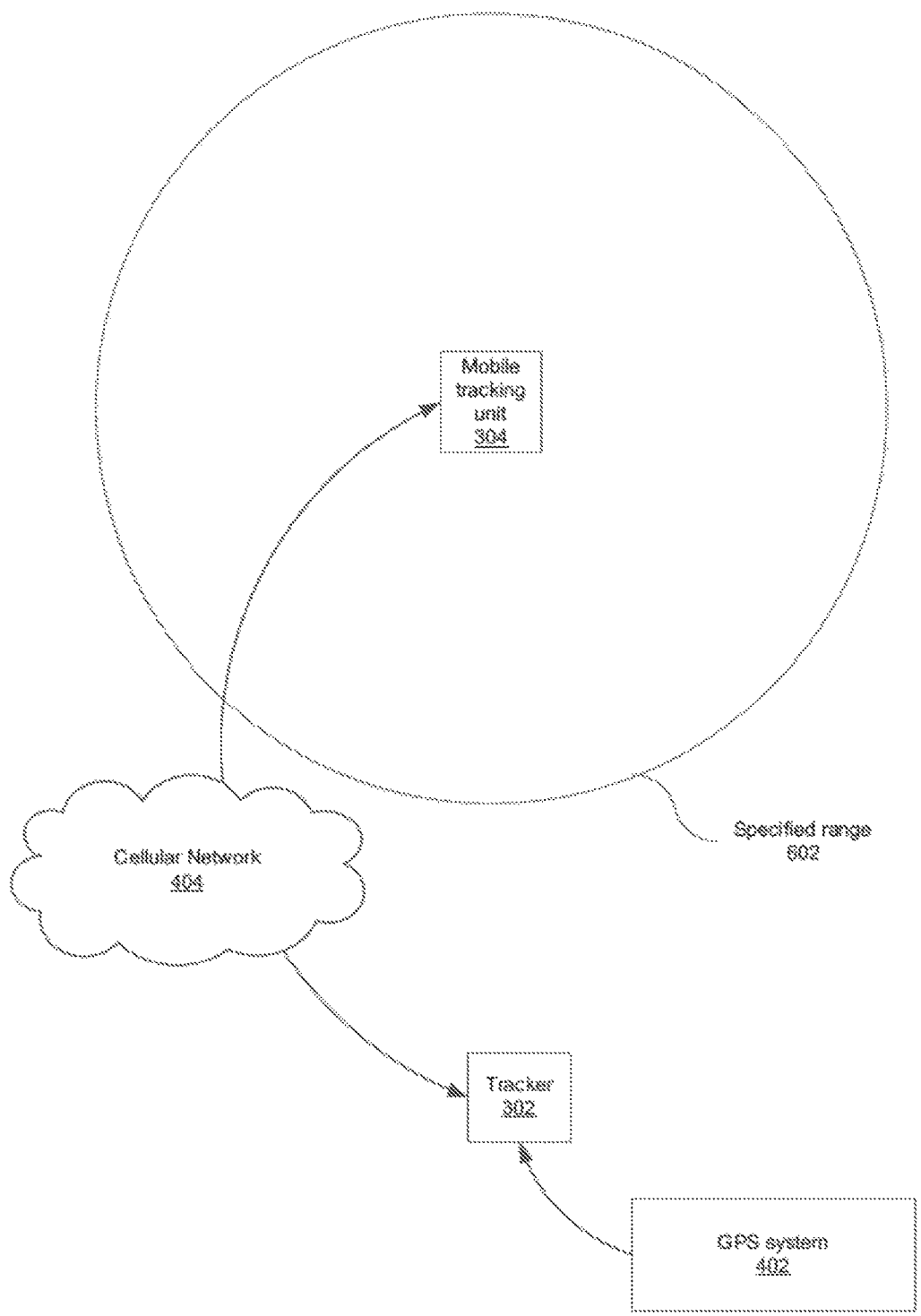
FIG. 6 is an illustrative block diagram depicting communication between the mobile tracking unit and the base station outside a specified range.

FIG. 6 is a block diagram illustrating a case where a user has initiated an active tracking event and the base station 302 is outside the specified range 602. While the ranges discussed in connection with FIG. 5 represented a maximum distance over which the mobile tracking unit 304 could communicate using the associated network, the specified range 602 represents a distance between the mobile tracking unit 304 and the base station 302. The mobile tracking unit 304 may change its behavior once the base station 302 is within the specified range 602.

In the depicted embodiment, the mobile tracking unit 304 and the base station 302 communicate using the cellular network 404. The mobile tracking unit 304 may, for example, report its current location. While the base station 302 is outside the specified range 602, the mobile tracking unit 304 may determine its position using a low-power approach such as cellular approaches based on the cellular network 404. The mobile tracking unit 304 may determine its position using the cellular network 404 and communicate its position to the base station 302 over the cellular network 404. The base station 302 may determine its position using the GPS system 402 and communicate its position to the mobile tracking unit 304 over the cellular network 404. In other embodiments, the base station 302 uses the cellular network 404 instead of, or in addition to, the GPS system 402 to determine the position of the base station 302.

The base station 302 may communicate its current position to the mobile tracking unit 304, which may then compare the current position of the base station 302 and the current position of the mobile tracking unit 304 in order to determine whether the base station 302 is within the specified range 602. The mobile tracking unit 304 may also use the current position of the base station 302 to decide which method of determining its position the mobile tracking unit 304 should use. In other embodiments, the base station 302 receives the current position of the mobile tracking unit 304 and determines whether the base station 302 is within the specified range 602 of the mobile tracking unit 304. If the base station 302 is within the specified range 602, the base station 302 may send a command instructing the mobile tracking unit 304 to use the GPS system 402 to determine the mobile tracking unit 304 location.

While FIG. 6 shows the specified range 602 as a sphere surrounding the mobile tracking unit 304, a non-spherical range may be desirable in other embodiments. Furthermore, while the specified range 602 in FIG. 6 is illustrated as surrounding the mobile tracking unit 304, it may also be correct to illustrate the specified range 602 as surrounding the base station 302.

Figure 7:
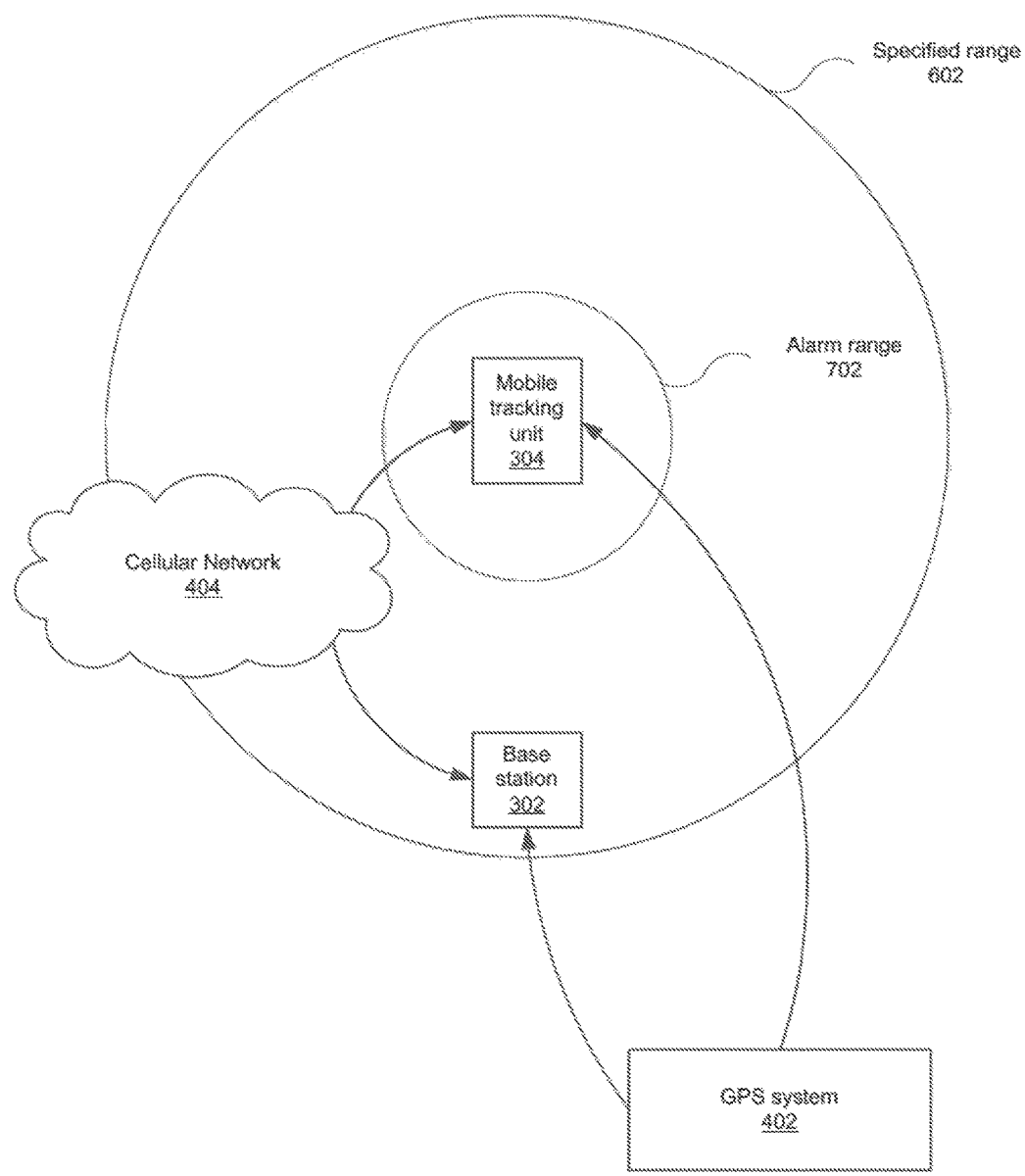
FIG. 7 is an illustrative block diagram depicting communication between the mobile tracking unit and the base station inside a specified range.

FIG. 7 illustrates the base station 302 and the mobile tracking unit 304 within the specified range 602. When the base station 302 is within the specified range 602 while there is an active tracking event for the mobile tracking unit 304, the mobile tracking unit 304 may begin using a high power location module 312 such as a GPS module. For example, the mobile tracking unit 304, as illustrated in FIG. 7, may begin to request and to receive position information from the GPS system 402. The mobile tracking unit 304 may communicate its current position, as determined using the GPS system 402, to the base station 302 over the cellular network 404. As noted above, the mobile tracking unit 304 may use both the cellular network 404 and the GPS system 402 together to determine its current position.

The mobile tracking unit 304 may also adjust the length of the sleep interval in response to the base station 302 approaching the mobile tracking unit 304. In certain embodiments, the mobile tracking unit 304 gradually decreases the length of the sleep interval as the base station 302 approaches the mobile tracking unit 304. The mobile tracking unit 304 may also be configured to remain in a powered on stage once the base station 302 is within the specified range 602. Such an approach may maximize battery life for the mobile tracking unit 304 without unduly compromising the ability of the user to locate the mobile tracking unit 304.

The mobile tracking unit 304 may take additional actions as the base station 302 approaches the mobile tracking unit 304. For example, the mobile tracking unit 304 may have an alarm range 702. When the base station 302 enters the alarm range 702, the mobile tracking unit 304 may begin generating alarms to help the user locate the mobile tracking unit 304. For example, the mobile tracking unit 304 may generate audio alarms, such as beeps or chirps. The mobile tracking unit 304 may generate visual alarms, such as flashing an LED light. The mobile tracking unit 304 may vibrate. Other alarms, or combinations of the above, may also be used to help the user locate the mobile tracking unit 304 when the user is within the alarm range 702. In certain embodiments, the user may disable the alerts from the base station 302 if alerts are not desirable.

The mobile tracking unit 304 may prompt the user to end the active tracking event when the user has located the mobile tracking unit 304. For example, the mobile tracking unit 304 may include a button that the user may press to end the alarms described above. The mobile tracking unit 304 may interpret the button press as an input to end the alarms and to signal the end of the active tracking event. The mobile tracking unit 304 may send a message to the base station 302 and/or the control unit 102 indicating that the active tracking event has been closed. In other embodiments, the base station 302 prompts the user to end the active tracking event using the base station 302. For example, the base station 302 may have a graphical user interface (GUI) with a button that the user may press when the user has located the mobile tracking unit 304. In response, the base station 302 may send a message to the mobile tracking unit 304 and/or the control unit 102 indicating that the active tracking has been closed. A similar approach may be used to allow the user to end the active tracking event from the control unit 102.

Figure 8:
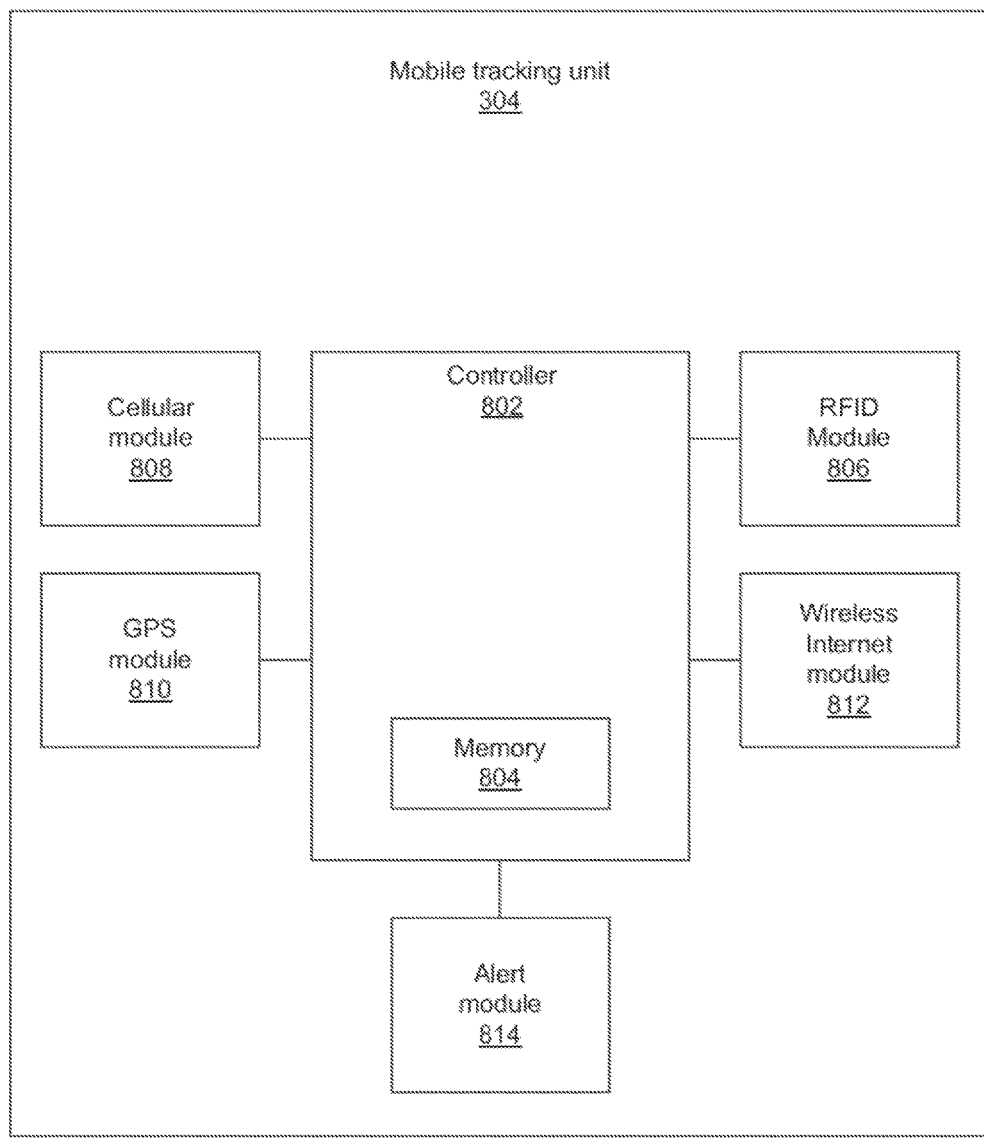
FIG. 8 is an illustrative block diagram depicting one embodiment of a mobile tracking unit.

FIG. 8 illustrates one embodiment of a mobile tracking unit 304. The mobile tracking unit 304 may include a controller 802, an RFID module 806, a wireless Internet module 812, a cellular module 808, and a GPS module 810. The mobile tracking unit 304 may include additional or different modules than those illustrated in FIG. 8.

The mobile tracking unit 304 may have a variety of form factors. In certain embodiments, as noted above, the mobile tracking unit 304 may be a portable electronic device (such as a cellular phone) having software to implement tracking functionality. In other embodiments, the mobile tracking unit 304 is a stand-alone unit. The mobile tracking unit 304 may be a small tag that may be attached to a pet's collar, a child's shirt, a purse, a set of keys, or other item. The mobile tracking unit 304 may be a key fob. The mobile tracking unit 304 may be waterproof to maximize protection for the mobile tracking unit 304. The mobile tracking unit 304 may also have one or more connectors allowing the user to charge the battery of the mobile tracking unit 304, and/or download data such as positional data. The mobile tracking unit 304 may be further configured to receive data over a data connection; for example, the user may be able to upload data, such as fences defining a geographic boundary for the mobile tracking unit 304, over the connection. In other embodiments, data may be downloaded and uploaded remotely through cellular or wireless Internet connections.

The RFID module 806 may include an RFID transmitter and/or receiver for communicating messages using RFID. The RFID module 806 may include passive RFID components, battery-assisted RFID components, or active RFID components. In certain embodiments, the RFID module 806 may power on and power off the controller 802. The RFID module 806 may be configured to keep the controller 802 powered off while the RFID module 806 is in communication with one or more known RFID readers, such as an RFID reader associated with the control unit 102. The controller 802 may be able to turn the RFID module 806 module on and off.

The mobile tracking unit 304 may also include a wireless Internet (commonly referred to as WiFi) module 812. The wireless Internet module 812 may enable the mobile tracking unit 304 to communicate in accordance with the Institute of Electrical and Electronics Engineers' (IEEE) 802.11 standards. As described above, the mobile tracking unit 304 may use the wireless Internet module 812 to determine its location in addition to communicating messages with other devices such as the base station 302 and the control unit 102. The controller 802 may be able to turn the wireless Internet module 812 on and off.

The mobile tracking unit 304 may also include a cellular module 808 enabling the mobile tracking unit 304 to communicate information over a cellular network 404. The cellular module 808 may further allow the mobile tracking unit 304 to determine its location, as described above. The cellular module 808 may use any of a variety of cellular technologies, including Global System for Mobile Communications (GSM), General Packet Radio Service (GPRS), Code Division Multiple Access (CDMA), Enhanced Data Rates for GSM Evolution (EDGE), or others. The mobile tracking unit 304 may be able to turn the cellular module 808 on and off.

The mobile tracking unit 304 may also include a GPS module 810 that allows the mobile tracking unit 304 to receive positional information from a GPS system 402. The GPS module 810 communicates with one or more GPS satellites and gathers position information which may be received by the controller 802. As above, the mobile tracking unit 304 may be able to turn the GPS module 810 on and off.

In one embodiment, the controller 802 is configured to attempt to determine its location using networks that are local to a control unit 102. For example, a home may have a wireless internet network and an RFID reader on the premises. The controller 802 may, when needing to determine the location of the mobile tracking unit 304, begin by trying the RFID module 806 and the wireless internet module 812. If the controller 802 may establish a connection with a local network, the controller 802 may report its location based on that connection. In one embodiment, only if the controller 802 cannot connect to a local network does the controller 802 attempt to use the cellular module 808 and/or the GPS module 810 to determine the location of the mobile tracking unit 304. In such an embodiment, the mobile tracking unit 304 may still allow the user and/or the base station 302 to instruct the controller 802 to use the cellular module 808 and/or the GPS module 810 and thus override the above-described behavior.

The controller 802 may store data and instructions in memory 804. The controller 802 may implement one or more programs to give the mobile tracking unit 304 described in this disclosure. The controller 802 may cause the mobile tracking unit 304 to periodically determine the location of the mobile tracking unit 304. The controller 802 may determine its location, report its location using one of the modules described above, and enter a low power state for a sleep interval.

In one embodiment, the controller 802 powers on following a sleep interval. The controller 802 may power on the wireless Internet module 812 and generate a message asking whether there is an active tracking event for the mobile tracking unit 304. The controller 802 may also provide its location using the wireless Internet module 812. If there is no active tracking event open, the controller 802 may power off the wireless Internet module 812 and enter the low power mode for a sleep interval. In one embodiment, the sleep interval is twenty minutes.

After the sleep interval, the controller 802 may again power on and turn on the wireless Internet module 812. The controller 802 may not be able to find a wireless network using the wireless Internet module 812. The controller 802 may turn off the wireless Internet module 812 and power on a cellular module 808. The controller 802 may then generate a message asking whether there is an active tracking event for the mobile tracking unit 304 and providing its current location using the cellular module 808. If there is no active tracking event open, the controller 802 may store a value in memory 804 such that, when the controller 802 next powers on, it uses the cellular module 808 to attempt communication instead of the wireless Internet module 812. The controller 802 may turn off the cellular module 808 and enter the low power mode for the sleep interval.

After the sleep interval, the controller 802 may again power on and turn on the cellular module 808. The controller 802 may determine that there is an active tracking event for the mobile tracking unit 304. The controller 802 may also receive, over the cellular module 808, the position of the base station 302 associated with the active tracking event. The controller 802 may compare the current position of the mobile tracking unit 304 with the current position of the base station 302. If the difference is greater than a predefined value, the controller 802 may store a value in memory 804 such that, when the controller 802 next powers on, it uses the cellular module 808 to determine its location. The controller 802 may also shorten the length of the sleep interval. For example, the controller 802 may shorten the length of the sleep interval to five minutes.

In certain embodiments, the controller 802 dynamically shortens the length of the sleep interval based on the difference between the current position of the mobile tracking unit 304 and the base station 302. The controller 802 may shorten the length of the sleep interval as the base station 302 gets closer to the mobile tracking unit 304.

After the five-minute sleep interval, the controller 802 again powers on and turns on the cellular module 808 to determine its current position and exchange information with the base station 302. The controller 802 may determine that the distance separating the base station 302 and the mobile tracking unit 304 is less than the predefined value. In response, the controller 802 may make future determinations of the position of the mobile tracking unit 304 using the GPS module 810.

The controller 802 may maintain an active state while the base station 302 is within the predefined distance from the mobile tracking unit 304. The controller 802 may keep power to the cellular module 808 in order to communicate with the base station 302, and may also power on the GPS module 810. As the controller 802 receives position information from the GPS module 810, the controller 802 may use that information to determine its current position and send that information to the base station 302. The controller 802 may continue to monitor the distance between the mobile tracking unit 304 and the base station 302. The controller 802 may cause the alert module 814 to generate one or more perceivable alarms for the user, as described above, once the base station 302 is within a certain distance from the mobile tracking unit 304.

The controller 802 may also adjust the length of the sleep interval based on whether or not the position of the mobile tracking unit 304 is changing. If the position of the mobile tracking unit 304 has been substantially the same for a number of checks, the controller 802 may decrease the frequency with which the controller 802 checks the position of the mobile tracking unit 304. The controller 802 may, for example, increase the length of the sleep interval each time the current position falls within the margin of error for the selected position-determining approach. The controller 802 may set a maximum length for the sleep interval. For example, the sleep interval may not be allowed to exceed one hour.

In another embodiment, the controller 802 may change the frequency with which it checks position based on the current location of the mobile tracking unit 304. In one embodiment, a user may define virtual fences for the mobile tracking unit 304. The behavior of the controller 802 may vary depending on whether the mobile tracking unit 304 is within the fence or outside the fence. The controller 802 may be configured to sleep for sleep intervals (as described above) while within the fence, but may be configured to remain active while outside the fence. The controller 802 may be configured to keep the cellular module 808 on and connected while outside the fence such that the mobile tracking unit 304 may immediately receive communications (such as a notification of an active tracking event) while outside the fence.

The controller 802 may also be configured to adjust the length of the sleep interval based on the battery level for the mobile tracking unit 304. The controller 802 may, for example, maintain the sleep interval at a longer length than normal as the user approaches the mobile tracking unit 304 if the battery level is low. The controller 802 may be configured to increase the length of the sleep interval as the battery level decreases. The controller 802 may, for example, increase the length of the sleep interval if the battery level is low and there is no active tracking event open for the mobile tracking unit 304. The controller 802 may also be configured to send an alert to the control unit 102 and/or the base station 302 that the battery level is low, and that the battery needs to be charged and/or replaced. Such embodiments may help prevent the mobile tracking unit 304 from running out of battery power before the user may locate the mobile tracking unit 304.

In certain embodiments, the controller 802 may, after determining the current position of the mobile tracking unit 304, compare the current position with a previous position. The controller 802 may send the current position of the mobile tracking unit 304 only if the current position is substantially different from the previous position. The controller 802 may be aware of the estimated accuracy with which the position of the mobile tracking unit 304 may be reported for the approach used to determine the current position. For example, when using the cellular module 808 to determine position, the mobile tracking unit 304 may be able to determine accuracy within fifty meters. The controller 802 may be configured to report the current position only if it is more than fifty meters away from the previous position of the controller mobile tracking unit 304.

The controller 802 may also include a user interface allowing a user to provide input. The user interface may be as simple as a few push buttons. In one embodiment, the user interface allows a user to initiate an active tracking event from the mobile tracking unit 304. In response, the controller 802 may awaken and transmit position information, and notification of the active tracking event, to the control unit 102 and/or the base station 302. Such an embodiment may allow a lost child to alert a parent that the child is lost and requires assistance. Where the mobile tracking unit 304 is attached to a purse, keys, or other inanimate object, the user interface may allow the finder to easily alert the owner that the item has been lost. Given that, in many instances, the owner may not be aware that the item has been lost for a period of time, the user interface may beneficially allow the finder to provide appropriate notification and alert the owner.

Figure 9:
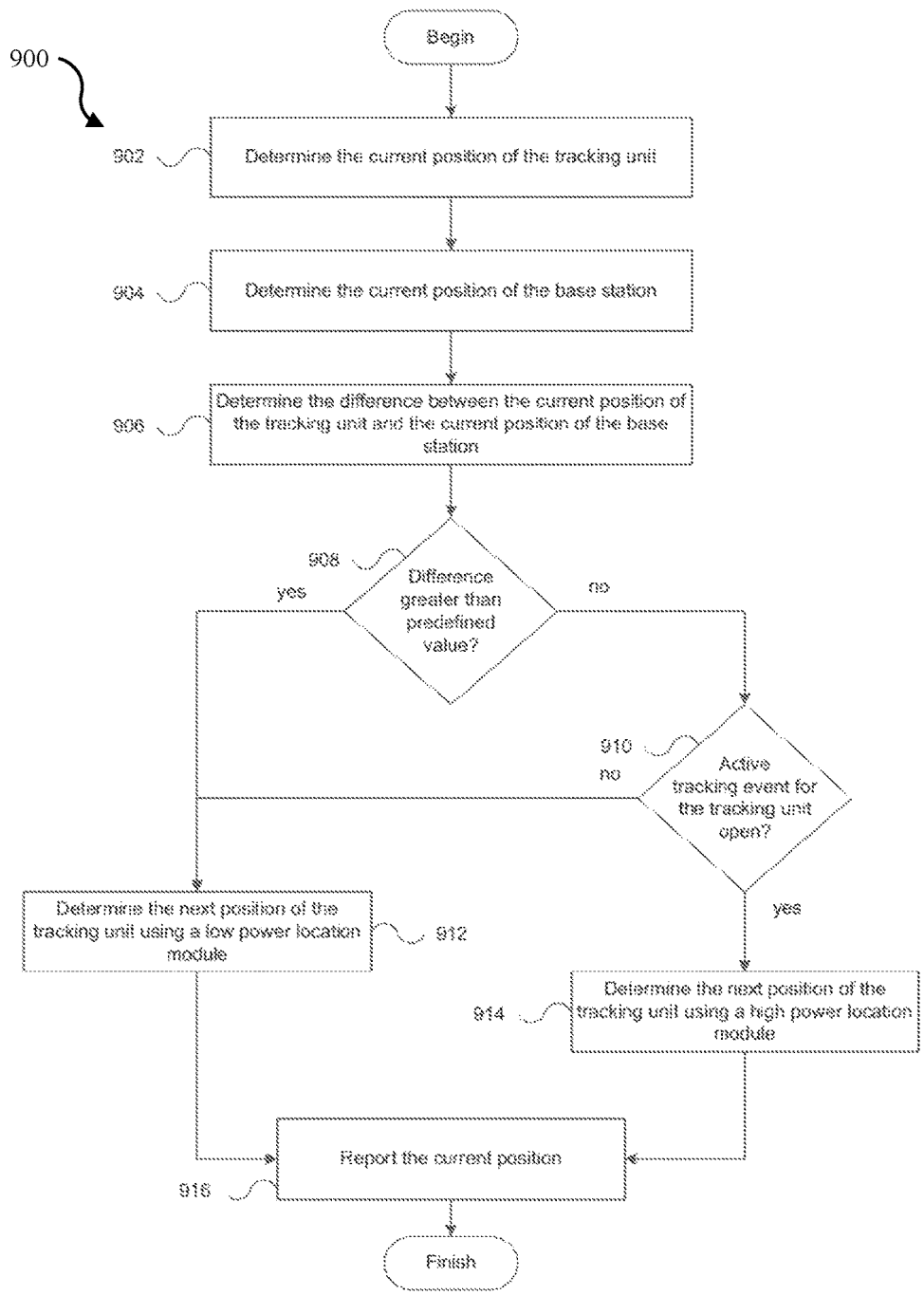
FIG. 9 is a flowchart illustrating a method for tracking a mobile tracking unit.

FIG. 9 illustrates one embodiment of a method 900 for maintaining the position of a mobile tracking unit. The method 900 shown in FIG. 9 is one embodiment of a method related to aspects of the present disclosure. The present disclosure may involve more, fewer, or different steps than those shown. Unless stated otherwise, the steps shown in FIG. 9 may be performed in an order other than that shown in FIG. 9.

The method 900 may begin at block 902 with determining the current position of the mobile tracking unit. The mobile tracking unit may report its position using the approaches described above. The method may further involve, at block 904, determining the current position of a base station. At block 906, the method may involve determining the difference between the current position of the mobile tracking unit and the base station. This step may be performed by the base station, the mobile tracking unit, a control unit, or other component in communication with the base station and the mobile tracking unit.

The method 900 may also involve determining, at block 908, whether the difference between the current position of the mobile tracking unit and the base station is greater than a predefined value that represents a distance. If the difference is greater than the predefined value, the method may involve, at block 912, determining the next position of the mobile tracking unit using a low power location module. The low power location module may use, for example, cellular signals, wireless Internet signals, RFID signals, or other approaches to determine the next position.

If the difference is not greater than the predefined value, the method 900 may involve, at block 910, further determining whether an active tracking event for the mobile tracking unit is open. If not, the method 900 may involve determining the next position of the mobile tracking unit using the low power location module as shown at block 912. If an active tracking event for the mobile tracking unit is open, the method may involve determining, at block 914, the next position of the mobile tracking unit using the high power location module. The method 900 may further involve, at block 916, reporting the current position of the mobile tracking unit.

Figure 10:
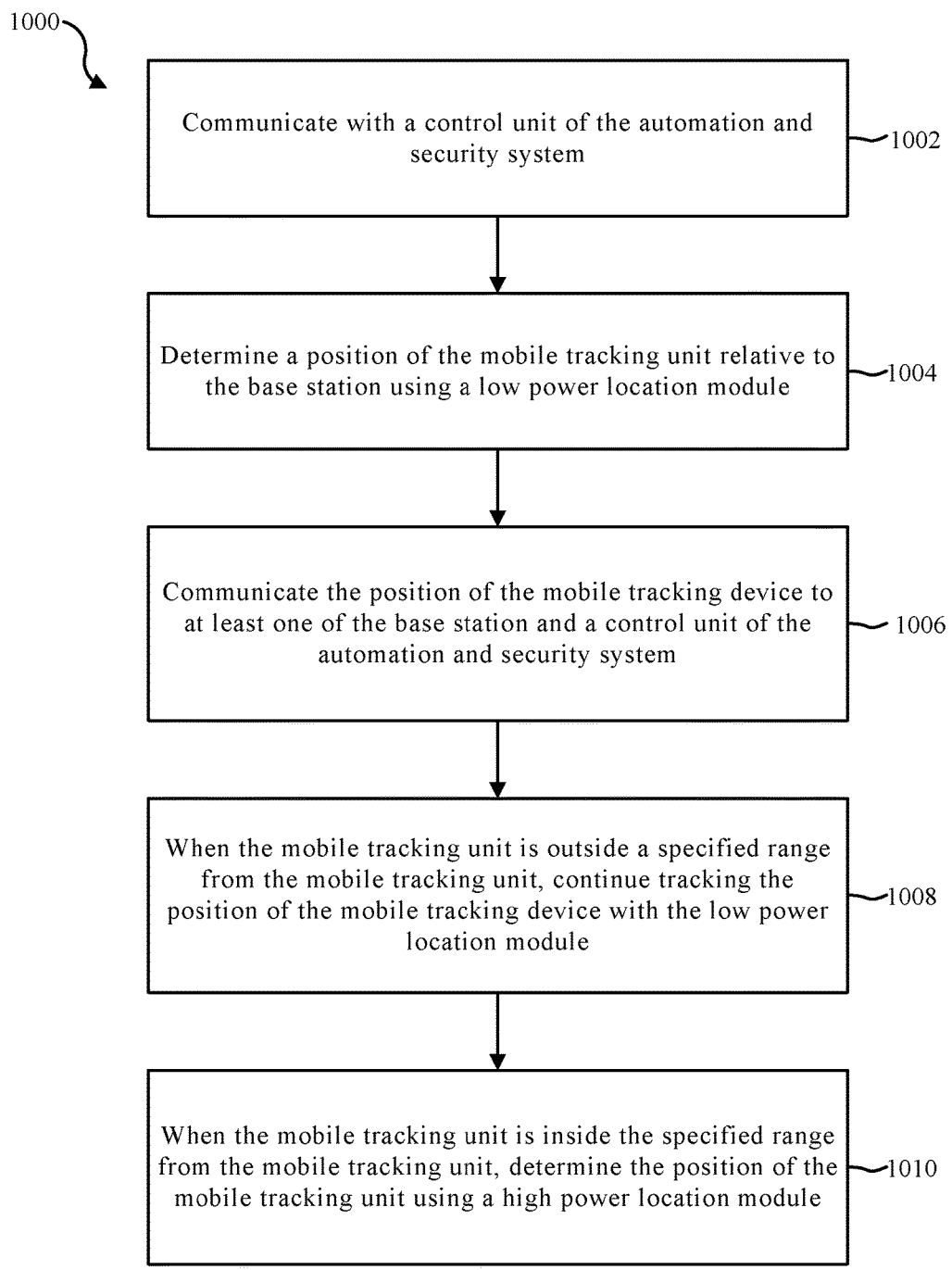
FIG. 10 is a flowchart illustrating another method for tracking a mobile tracking unit.

FIG. 10 illustrates one embodiment of a method 1000 for determining the position of a mobile tracking unit. The method 1000 shown in FIG. 10 is one embodiment of a method related to aspects of the present disclosure. The present disclosure may involve more, fewer, or different steps than those shown. Unless stated otherwise, the steps shown in FIG. 10 may be performed in an order other than that shown in FIG. 10.

The method 1000 may begin at block 1002 with communicating with a control unit of the automation and security system. Block 1004 includes determining a position of the mobile tracking unit relative to the base station using a low power location module. At block 1006, the method 1000 includes communicating the position of the mobile tracking device to at least one of the base station and a control unit of the automation and security system. Block 1008 includes continuing to track the position of the mobile tracking device with the low power location module when the mobile tracking unit is outside a specified range from the mobile tracking unit. Block 1010 includes determining the position of the mobile tracking unit using a high power location module when the mobile tracking unit is inside the specified range from the mobile tracking unit.

Figure 11:
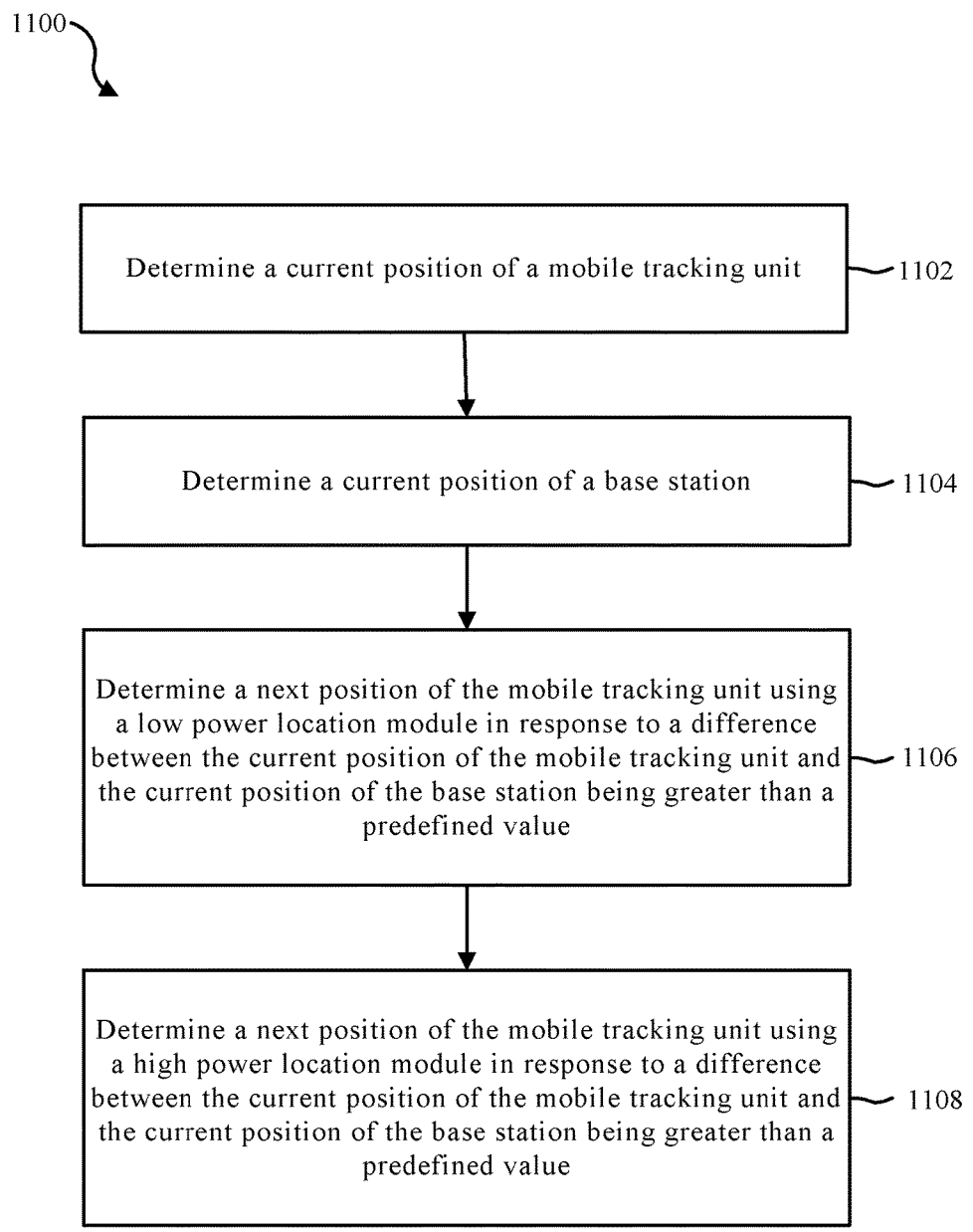
FIG. 11 is a flowchart illustrating another method for tracking a mobile tracking unit.

FIG. 11 illustrates one embodiment of a method 1100 for maintaining the position of a mobile tracking unit 304. The method 1100 shown in FIG. 11 is one embodiment of a method related to aspects of the present disclosure. The present disclosure may involve more, fewer, or different steps than those shown. Unless stated otherwise, the steps shown in FIG. 11 may be performed in an order other than that shown in FIG. 11.

The method 1100 may begin at block 1102, wherein with determining a current position of a mobile tracking unit. Block 1104 includes determining a current position of a base station. At block 1106, the method 1100 includes determining a next position of the mobile tracking unit using a low power location module in response to a difference between the current position of the mobile tracking unit and the current position of the base station being greater than a predefined value. Block 1108 includes determining a next position of the mobile tracking unit using a high power location module in response to a difference between the current position of the mobile tracking unit and the current position of the base station being greater than a predefined value.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures may be implemented to achieve the same functionality.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method associated with an automation and/or security system, comprising:
 determining a base station position;
 determining a mobile tracking unit position;
 communicating at least one of a message to the mobile tracking unit associated with the base station position or a message to the base station associated with the mobile tracking unit position;
 receiving a message from the mobile tracking unit associated with one of a low power location component of the mobile tracking unit based at least in part on a first distance between the mobile tracking unit position and the base station position being greater than a threshold, or a high power location component of the mobile tracking unit based at least in part on the distance being less than the threshold.

2. The method of claim 1, further comprising:
 determining whether the first distance between the base station position and the mobile tracking unit position is less than the threshold.

3. The method of claim 2, wherein communicating at least one of the message to the mobile tracking unit associated with the base station position or the message to the base station associated with mobile tracking unit position comprises:
 communicating, based at least in part on the determining whether the first distance is less than the threshold, an indication whether the first distance is less than the threshold.

4. The method of claim 2, further comprising:
 issuing a command, based at least in part on the determining whether the first distance is less than the threshold, to the mobile tracking unit to use one of the low power location component if the first distance is greater than the threshold, or the high power location component if the first distance is less than the threshold.

5. The method of claim 4, wherein determining the mobile tracking unit position comprises determining the mobile tracking unit position at a first time; and
  wherein using one of the low power location component or the high power location component comprises using one of the lower power location component or the high power component to determine the mobile tracking unit position at a second time.

6. The method of claim 1, wherein the message from the mobile tracking unit associated with the low power location component comprises an indication of the mobile tracking unit position determined using the low power location component; or
  wherein the message from the mobile tracking unit associated with the high power location component comprises an indication of the mobile tracking unit position determined using the high power location component.

7. The method of claim 6, wherein the indication of the mobile tracking unit position is of the mobile tracking unit position at a first time; and
  wherein the mobile tracking unit position determined using one of the low power location component or the high power location component comprises the mobile tracking position determined using one of the low power location component or the high power location component at a second time, wherein the second time is after the first time.

8. The method of claim 7, wherein determining the base station position comprises determining the base station position at a first time; and
  wherein communicating to the mobile tracking unit the message associated with the base station position comprises communicating to the mobile tracking unit a first message associated with the base station position at the first time; and
  further comprising communicating to the mobile tracking unit a second message associated with the base station position at a second time.

9. The method of claim 8, wherein the base station position at the first time is different from the base station position at the second time; and
  wherein the mobile tracking unit position at the first time is different from the mobile tracking unit position at the second time.

10. The method of claim 1, wherein determining the mobile tracking unit position comprises at least one of receiving from the mobile tracking unit an indication of the mobile tracking unit position, or receiving from the base station an indication of the mobile tracking unit position; and
  wherein determining the base station position comprises at least one of receiving from the base station an indication of the base station position, or receiving from mobile tracking unit an indication of the base station position.

11. The method of claim 1, wherein receiving the message from the mobile tracking unit associated with the low power location component of the mobile tracking unit comprises receiving a message from the mobile tracking unit associated with a cellular module configured to communicate over a cellular network; and
  wherein receiving the message from the mobile tracking unit associated with the high power location component of the mobile tracking unit comprises receiving a message from the mobile tracking unit associated with a global positioning system (GPS) module configured to obtain location information for the mobile tracking unit using a GPS network.

12. The method of claim 1, further comprising:
initiating an active tracking event.

13. The method of claim 12, wherein initiating the active tracking event is based at least in part on receiving a user input from at least one of a control unit of the automation and/or security system, the mobile tracking unit, the base station, or a network.

14. The method of claim 12, wherein receiving the message from the mobile tracking unit associated with the high power location component is further based at least in part on receiving the initiated active tracking event.

15. The method of claim 12, further comprising prompting a user to take an action to end the active tracking event.

16. The method of claim 12, wherein receiving the message from the mobile tracking unit associated with one of the low power location component of the high power component comprises receiving information associated with the mobile tracking unit position at more frequent intervals based at least in part on at least one of the active tracking event or the first distance being greater than the threshold or the first distance being greater than another threshold.

17. The method of claim 1, wherein the mobile tracking unit comprises a certain mobile tracking unit of a plurality of mobile tracking units; and
  wherein determining the mobile tracking unit position is based at least in part on a user selection of the certain mobile tracking unit out of the plurality of mobile tracking units.

18. The method of claim 1, further comprising:
logging information associated with at least one of the base station position or the mobile tracking unit position.

19. A control unit of an automation and/or security system, comprising:
  a processor;
  a memory in electronic communication with the processor; and
  instructions stored in the memory, the instructions being executable by the processor to:
  determine a base station position;
  determine a mobile tracking unit position;
  communicate at least one of a message to the mobile tracking unit associated with the base station position or a message to the base station associated with the mobile tracking unit position;
  receive a message from the mobile tracking unit associated with one of a low power location component of the mobile tracking unit based at least in part on a first distance between the mobile tracking unit position and the base station position being greater than a threshold, or a high power location component of the mobile tracking unit based at least in part on the distance being less than the threshold.

20. A method for tracking, comprising:
determining a base station position;
determining a mobile tracking unit position;
communicating at least one of a message to the mobile tracking unit associated with the base station position or a message to the base station associated with the mobile tracking unit position;
receiving a message from the mobile tracking unit associated with one of a low power location component of the mobile tracking unit based at least in part on a first distance between the mobile tracking unit position and the base station position being greater than a threshold, or a high power location component of the mobile tracking unit based at least in part on the distance being less than the threshold.

* * * * *